United States Patent [19]

Blum

[11] 4,407,242

[45] Oct. 4, 1983

[54] VALVE SEATS

[75] Inventor: Alfred E. G. Blum, Greatford, England

[73] Assignee: Massey-Ferguson-Perkins Limited, London, England

[21] Appl. No.: 261,228

[22] PCT Filed: Sep. 8, 1980

[86] PCT No.: PCT/GB80/00137

§ 371 Date: May 8, 1981

§ 102(e) Date: May 4, 1981

[87] PCT Pub. No.: WO81/00737

PCT Pub. Date: Mar. 19, 1981

[30] Foreign Application Priority Data

Sep. 8, 1979 [GB] United Kingdom ................. 7931261

[51] Int. Cl.³ .............................................. F01L 3/22
[52] U.S. Cl. ................................................. 123/188 S
[58] Field of Search ............... 123/188 S; 29/156.7 A, 29/156.7 R

[56] References Cited

U.S. PATENT DOCUMENTS

| 2,178,895 | 11/1939 | Myers | 123/188 S |
| 3,822,680 | 7/1974 | Showalter et al. | 123/188 S |
| 4,108,132 | 8/1978 | Hayashi | 123/188 S |

FOREIGN PATENT DOCUMENTS

| 600911 | 2/1926 | France. | |
| 1397161 | 3/1965 | France. | |
| 2358016 | 10/1978 | France. | |
| 320830 | 10/1929 | United Kingdom | 29/156.7 A |
| 568458 | 10/1943 | United Kingdom. | |

Primary Examiner—William A. Cuchlinski, Jr.
Attorney, Agent, or Firm—John C. Thompson

[57] ABSTRACT

This invention relates to engine valve seats of the kind comprising a body with an annular inner peripheral portion that carries a frusto-conical valve face adapted to be engaged by a valve member that is coaxial with and is movable along the axis of said frusto-conical valve.

12 Claims, 10 Drawing Figures

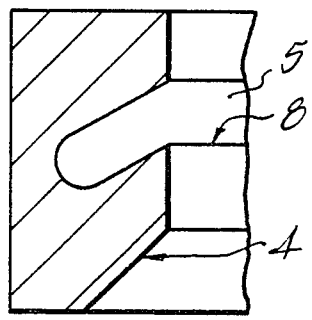
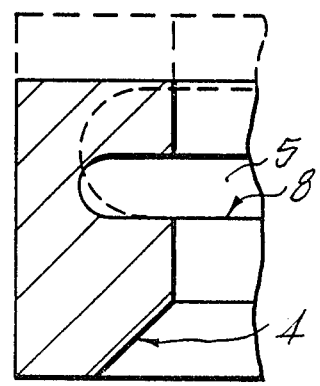
FIG. 3.    FIG. 4.
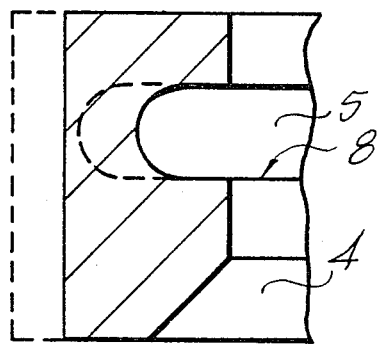
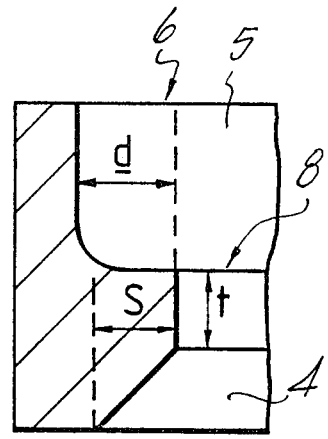
FIG. 5.    FIG. 6.

VALVE SEATS

TECHNICAL FIELD

A problem met with in internal combustion engines is valve sinkage leading to reduced valve clearance and finally preventing full closing of the valve. The object of the present invention is to reduce or overcome this problem.

French Pat. No. 2385016 discloses a number of valve constructions which include an annular valve seat having an inner peripheral portion that is formed with a groove so as to produce a cantilevered lip that flexes when engaged by a valve member. However, none of the valves disclosed are engine valves and none possess a valve seat of the aforesaid kind having a frusto-conical valve face adapted to be engaged by a valve member coaxial with and movable along the axis of the valve face.

DISCLOSURE OF THE INVENTION

The invention is based on an appreciation of the fact that valve sinkage is caused by wear of the valve and valve seat induced mainly by relative movement of the engaging faces of the valve and valve seat when closed, and by inertia effects on closing the valve. It has been appreciated that such wear can be reduced by increasing the flexibility of the valve seat. This is achieved according to the invention by providing that said inner peripheral portion is cantilevered over at least the full width of the valve face as measured radially of the axis of the valve face so that said valve face is deflected in bending and shear when subjected to valve gas and inertia seating forces.

Preferably, said inner peripheral portion is undercut. The undercut may be formed by an annular groove in the inner wall of the valve seat adjacent to the valve engaging face, whether the valve seat is an integral part of a valve port body or is formed as an insert in the mouth of the valve port body. Alternatively, if the valve seat is formed as an insert, the undercut may be formed as a recess opening rearwards at the base of the insert.

It has been found that the inherent flexibility of the valve seat alone can be significantly increased in this manner, an increase of 30 percent deflection at the inner periphery of the valve seat being readily achieved and being regarded for practical purposes as a minimum worthwhile level of increased flexibility over the corresponding valve seat without the inner peripheral portion cantilevered.

The increased flexibility of the valve seat not only reduces the seating forces that develop during closure of the valve due to inertia effects, but also provides a more even distribution of the load between the engaging faces of the valve and valve seat and reduces sliding between these faces whenever the closed or partly closed valve is subjected to forces which are being reacted by the seating faces, it being immaterial whether the applied forces are due to gas or to inertia. Each of these effects in turn serves to reduce wear and thereby helps to alleviate or eliminate valve sinkage.

DESCRIPTION OF THE DRAWINGS

The invention will now be described by way of example with reference to the accompanying drawings in which FIGS. 3 to 5 show how the valve seat insert of FIG. 2 can be modified to provide the greatest possible flexibility consistent with stress levels in the annular groove, FIG. 6 shows an alternative valve seat insert according to the invention.

BEST METHOD OF THE INVENTION

Figure 1:
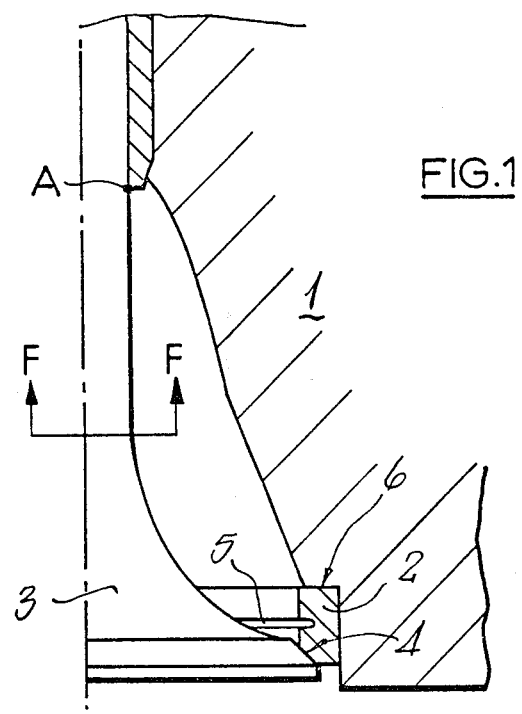
FIG. 1 is a schematic axial section of half of a diesel engine valve port body fitted with a valve seat insert according to the invention.

FIG. 1 shows a cylinder head body 1 fitted with a valve seat insert 2 for a valve 3. The insert 2 has a frustoconical valve engaging face 4 and is formed with an annular groove 5 in its inner peripheral wall.

Figure 7:
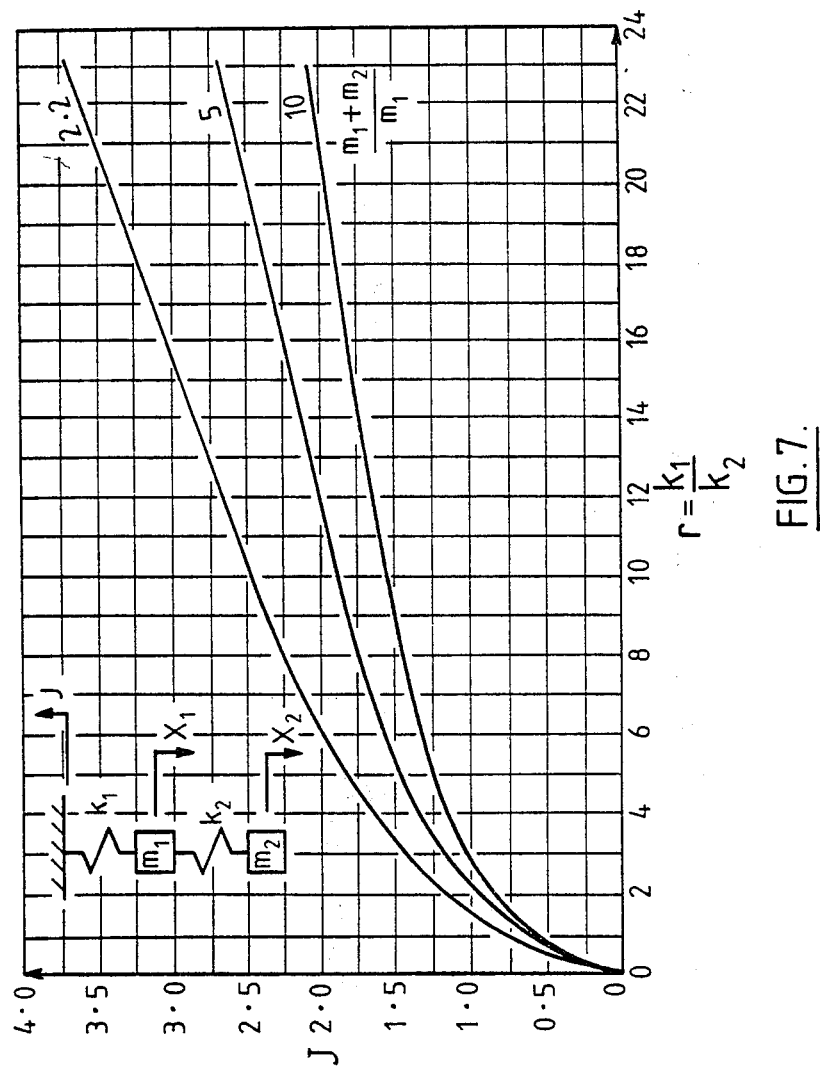
FIG. 7 is a graph showing how valve seating forces vary with the flexibility of the valve seat.

To give some appreciation of the reduction of valve seating forces which flexible valve seats may provide, the valve and valve seat insert at the moment of impact of the valve on the valve seat are considered as a two mass—two spring system, as shown in FIG. 7, where $m_1$ is the mass of that portion of the valve that seats directly on the insert, $m_2$ is the mass of the valve and associated parts less $m_1$, $k_1$ is the stiffness of the insert and $k_2$ is the stiffness of the valve, which is considered constant, and $x_1$ and $x_2$ are the distances travelled by $m_1$ and $m_2$ respectively after the valve has engaged with the valve seat. It can be shown that the mean impulsive force J acting on the insert is given by the expression:

$$J \propto \left[ \frac{r^2}{r + (h-1)^2} \right]^{\frac{1}{2}}$$

where $r = k_1/k_2$ and $h = x_2/x_1$. The complex relations between J and the valve seat stiffness $k_1$ are shown by the curves of FIG. 7 for a range of arbitrary values of valve and valve seat stiffness $k_1$ and $k_2$ and valve masses $m_1$ and $m_2$.

These curves clearly demonstrate that the mean impulsive force exerted by the valve on the insert is reduced by reducing the stiffness of the insert $k_1$. They also demonstrate that the effect of reducing $k_1$ is most marked when $m_1$ the mass of that portion of the valve that seats directly on the insert is large, i.e. when $(m_1 + m_2)/m_1$ tends to unity. Typically, where $(m_1 + m_2)/m_1 = 2.2$, a 50 percent reduction in stiffness produces (over the range of values of $r = k_1/k_2$ from 10 to 30) about 30 percent reduction in the valve seating force J.

The above analysis does not take account of the mass of the valve seat which must be accelerated impulsively by the valve mass $m_1$ on seating the valve. The described analysis does not therefore show the full benefits that flexible valve seats may provide when inertia forces are the principal cause of valve sinkage.

Figure 8:
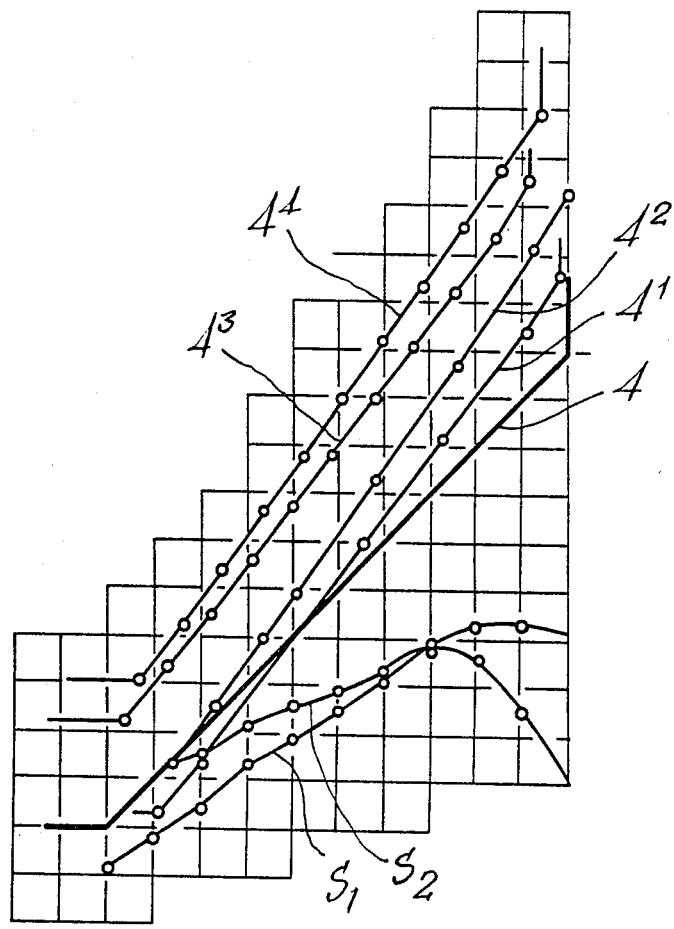
FIG. 8 is a diagram showing displacement and stress of the valve engaging face of the insert of FIGS. 1 and 2 for a given force.

FIG. 8 compares the displacement and stress of the valve engaging face 4 of the insert 2 with the displacement and stress for a similar insert without the groove 5, calculated by the finite element method. A force has been assumed to act axially on the valve 3 at F-F in FIG. 1 and a representative coefficient of friction has been assumed between the valve and valve seat faces. The displacement curves $4^1$ and $4^2$ represent the deflection of the valve seat face (shown in its nominal position in an unstressed condition at 4 in FIG. 8) without and with the groove 5 as measured relative to the base face 6 of the insert 2, that is, they are a measure of inherent flexibility. These curves indicate that the grooved insert deflects about twice as much as the un-grooved insert at its inner periphery. The displacement curves $4^3$ and $4^4$ represent the deflection of the valve seat face 4 without and with the groove 5 as measured relative to point A of the cylinder head, as shown in FIG. 1. These curves are therefore a measure of overall flexibility and show that the overall deflection of the valve seat and head 1 is again greater with the grooved insert, representing an increased deflection of about 40 percent at its inner periphery.

The stress curves $S_1$ and $S_2$ for the grooved and un-grooved inserts, respectively, which show the stress normal to the valve engaging face, indicate that the valve engaging face of the grooved insert is more uniformly loaded than the valve engaging face of the un-grooved insert, the peak stresses at the inner edge of the valve engaging face being reduced by about 30 percent while the outer edge is prevented from lifting off the seat. In FIG. 8 increasing stress is measured downwardly from the nominal position 4 of the valve engaging face.

Figure 9:
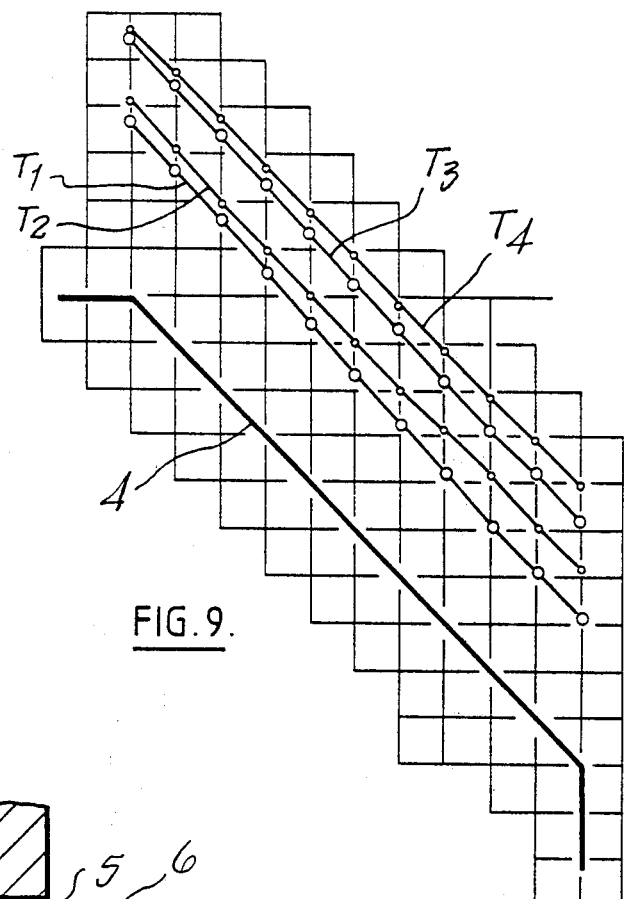
FIG. 9 is a diagram showing the sliding motion between the engaging faces of the valve and valve seat of FIGS. 1 and 2 for a given force.

FIG. 9 shows the relative sliding movement of the engaging faces of the valve 3 and grooved and un-grooved inserts 2, the degree of sliding movement being represented by the vertical ordinate axis. The curves $T_1$ and $T_2$ for the grooved and un-grooved inserts, respectively, clearly indicate that the sliding movement is reduced with the grooved insert as compared with the un-grooved insert, the reduction being 20 percent assuming a coefficient of friction of 0.2. Curves $T_3$ and $T_4$ represent the relative sliding movement for the grooved and un-grooved inserts, respectively, assuming zero friction.

The dimensions of the cross section of the insert and groove 5 may be varied as shown in FIGS. 4 and 5 in order to give the required increase in flexibility without creating unacceptable stresses therein. For example, the insert may be enlarged axially so as to accommodate a wider groove, as shown in FIG. 4, or may be enlarged radially so as to accommodate a deeper groove, as shown in FIG. 5, or the groove may be made wider by being displaced towards the base of the insert.

In other embodiments of the invention, the groove 5 in the insert may be inclined as shown in FIG. 3 or may be formed with non-parallel sides.

In all cases the groove is made of a size and shape to allow deflection of the valve seat and reduce contact stress and sliding. The groove is also internally radiused to minimise the stress at the base of the groove resulting from this deflection.

In other embodiments of the invention, the valve seat may be an integral part of the cylinder head 1 rather than being a separate insert, and the groove 5 may be formed in the inner wall of the valve seat in the same manner as shown in FIG. 1 to 5.

In yet another embodiment of the invention illustrated in FIG. 6, a valve seat insert 2 may be formed with a recess 5 opening rearwards onto its base face 6 so as to undercut the inner peripheral portion of the insert that carries the valve seat face 4. This recess 5 reduces the area of the rear base face but the resulting increased seating pressure on the cylinder head is still acceptable.

This shape of insert is particularly advantageous in that it can be readily manufactured by a simple machining operation from the rear of the insert or even by a mounding operation, such as powder forging, in which a shaped die forms the recess 6 and is withdrawn axially rearwards.

Figure 2:
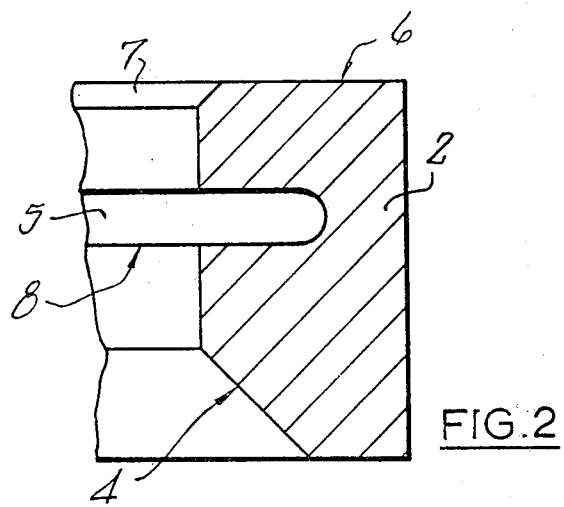
FIG. 2 is a section through the valve seat insert of FIG. 1 to a larger scale.

The increase in inherent flexibility of the valve seat due to the provision of the recess is substantially the same as that illustrated by curve $4^2$ in FIG. 8, the overall dimensions of the grooved valve seat of FIG. 2 and that of FIG. 6 being substantially the same.

It will be noted that it is known to provide a small notch or recess at the inner rear edge of a valve seat insert as shown at 7 in FIG. 2 so as to facilitate removal of the insert by a tool that is inserted through the port, engaged in said notch or recess 7 and then forcible withdrawn. However, the dimensions of this notch or recess 7 are kept as small as possible and thus said notch or recess has no substantial effect on the flexibility of the valve seat.

It will be appreciated that in all of the illustrated embodiments the groove or recess 5 extends radially outwards sufficiently to undercut substantially the whole width S (see FIG. 6) of the valve seat face 4. A groove or recess that extends radially outwards less than the whole radial width of the valve seat face 4 may not, generally, give a worthwhile degree of flexibility. Of course, other parameters affect the flexibility as indicated above in relation to FIGS. 3 to 5. Also typically the thickness t of the inner edge of the valve seat will be of the order of S/2 to 3S/4 but generally not less than 2 mm. (It will be noted that the drawings are not to scale in this respect).

The groove or recess 5 in all of the illustrated embodiments is such as to have a rearwardly directed face 8 adjacent to the valve seat face 4 that either lies in a plane substantially normal to the insert axis, or is inclined relative to said normal plane. Preferably, the recess or groove 5 has a concave form with a mouth opening inwards radially towards said insert axis. This contrasts with a recess formed by a planar chamfer across corner of the insert.

Figure 10:
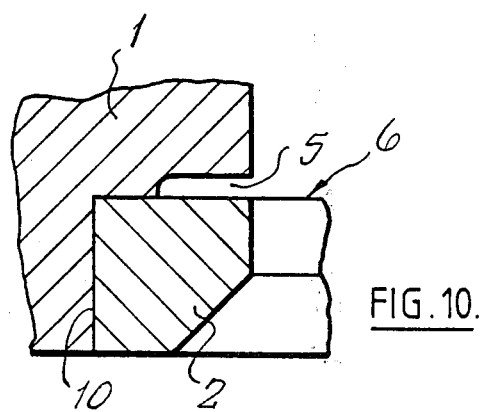
FIG. 10 is a section through part of yet another alternative valve seat assembly according to the invention.

In yet other embodiments of the invention the valve seat, as shown for example in FIG. 10, comprises an insert 2 that is received in a recess 10 in the cylinder head 1. The head 1 is cut away at 5 so that the inner peripheral portion of the insert is not directly supported by the head and is thus effectively cantilevered so that it deflects in bending and shear as in the previous embodiments.

In all the the valve seat inserts according to the invention described above, the insert has a base face 6 at its rear through which the axial operating loads are transferred to the cylinder head body 1, and the inner cantilevered portion of the valve seat lies in front of this base face 6.

I claim:

1. An engine valve seat comprising a body with an annular inner peripheral portion that carries a frustoconical valve face adapted to be engaged by a valve member that is coaxial with and is movable along the axis of said frusto-conical valve face characterized in that said inner peripheral portion is cantilevered over at least the full width of said valve face (4) as measured radially of said axis so that said valve face (4) is deflected in bending and shear when subject to valve gas and inertia seating forces.

2. A valve seat as claimed in claim 1 further characterized in that said inner peripheral portion is undercut (5).

3. The valve seat claimed in claim 2 further characterized in that said undercut is formed by an annular groove (5) in the inner periphery of the valve seat adjacent the valve engaging face (4).

4. The valve seat claimed in claim 3 further characterized in that the side walls of the groove extend substantially parallel to one another.

5. The valve seat as claimed in claim 3 further characterized in that said side walls lie in planes substantially normal to the central axis of the valve seat (2) along which the valve (3) is to move.

6. The valve seat as claimed in claim 3 further characterized in that the side walls of the groove (5) lie on conical surfaces.

7. The valve seat as claimed in claim 3 further characterized in that the base of the groove (5) is radiused.

8. The valve seat as claimed in claim 3 further characterized in that said body (2) is formed as an annular insert.

9. The valve seat as claimed in claim 2 further characterized in that said body (2) is formed as an annular insert and said undercut is formed by a recess (5) in the rear face (6) of the body.

10. The valve seat as claimed in claim 9 further characterized in that said recess (5) is of a concave form so that it has a mouth that opens rearwardly.

11. The valve seat as claimed in claim 10 further characterized in that said recess (5) has adjacent to said valve engaging face (4) a rearwardly directed face (8) that lies in a plane substantially normal to the central axis of the valve seat (2) along which the valve (3) is to move.

12. The valve seat as claimed in claim 11 further characterized in that said recess (5) opens rearwardly in a manner such as to allow a moulding die to be withdrawn from the recess during manufacture.

* * * * *